US012733059B2

(12) United States Patent
Zhou et al.

(10) Patent No.: US 12,733,059 B2
(45) Date of Patent: Sep. 8, 2026

(54) BEAM FAILURE RECOVERY VIA RELAY NODE

(71) Applicant: QUALCOMM Incorporated, San Diego, CA (US)

(72) Inventors: Shanyu Zhou, San Diego, CA (US); Jelena Damnjanovic, Del Mar, CA (US); Peter Gaal, San Diego, CA (US)

(*) Notice: Subject to any disclaimer, the term of this patent is extended or adjusted under 35 U.S.C. 154(b) by 417 days.

(21) Appl. No.: 18/464,791

(22) Filed: Sep. 11, 2023

(65) Prior Publication Data

US 2024/0138016 A1 Apr. 25, 2024
US 2024/0237120 A9 Jul. 11, 2024

Related U.S. Application Data

(60) Provisional application No. 63/380,476, filed on Oct. 21, 2022.

(51) Int. Cl.
*H04W 76/19* (2018.01)
*H04B 7/06* (2006.01)
*H04W 74/0833* (2024.01)

(52) U.S. Cl.
CPC ........ *H04W 76/19* (2018.02); *H04B 7/06964* (2023.05); *H04W 74/0833* (2013.01)

(58) Field of Classification Search
None
See application file for complete search history.

(56) References Cited

U.S. PATENT DOCUMENTS

2018/0219604 A1* 8/2018 Lu ............................ H04L 1/12
2019/0110281 A1* 4/2019 Zhou ..................... H04W 16/28
2020/0100298 A1* 3/2020 Pan ..................... H04W 56/001
2020/0322865 A1* 10/2020 Raghavan ........... H04W 36/305
(Continued)

FOREIGN PATENT DOCUMENTS

WO WO-2017024516 A1 * 2/2017 ............ H04B 7/088
WO WO-2019070437 4/2019
(Continued)

OTHER PUBLICATIONS

3GPP TR 36.746: "3rd Generation Partnership Project, Technical Specification Group Radio Access Network, Study On Further Enhancements to LTE Device to Device (D2D), User Equipment UE) to Network Relays for Internet of Things (IOT) and Wearables, (Release 15)", 3GPP Standard, Technical Report, 3rd Generation Partnership Project, Mobile Competence Centre, 650, Route Des Lucioles, F-06921 Sophia-Antipolis Cedex, France, vol. RAN WG2, No. V0.6.0, Jun. 24, 2017, pp. 1-36, XP051299036, Paragraph [04.3], Scenario 4, figures 4.3-1.
(Continued)

*Primary Examiner* — Faiyazkhan Ghafoerkhan

(57) ABSTRACT

Various aspects of the present disclosure generally relate to wireless communication. In some aspects, a user equipment (UE) may transmit a beam failure recovery (BFR) message regarding a failed link, wherein the failed link is one of an indirect link with a network node via a relay node or a direct link with the network node, wherein the BFR message is transmitted on one of the indirect link or the direct link that is not the failed link. The UE may receive an updated beam configuration for the failed link on a selected beam indicated by the BFR message. Numerous other aspects are described.

29 Claims, 12 Drawing Sheets

(56) References Cited

U.S. PATENT DOCUMENTS

| | | | | |
|---|---|---|---|---|
| 2020/0337115 | A1* | 10/2020 | Qin | H04B 7/0626 |
| 2024/0049099 | A1* | 2/2024 | Yao | H04W 36/033 |
| 2024/0138016 | A1* | 4/2024 | Zhou | H04B 7/06958 |
| 2024/0237120 | A9* | 7/2024 | Zhou | H04B 7/06964 |
| 2025/0048229 | A1* | 2/2025 | Yao | H04W 40/12 |

FOREIGN PATENT DOCUMENTS

| | | | | |
|---|---|---|---|---|
| WO | WO-2019070437 | A1 * | 4/2019 | H04W 16/28 |
| WO | WO-2020210041 | A1 * | 10/2020 | H04B 7/06964 |

OTHER PUBLICATIONS

International Search Report and Written Opinion—PCT/US2023/073954—ISA/EPO—Dec. 12, 2023.

* cited by examiner

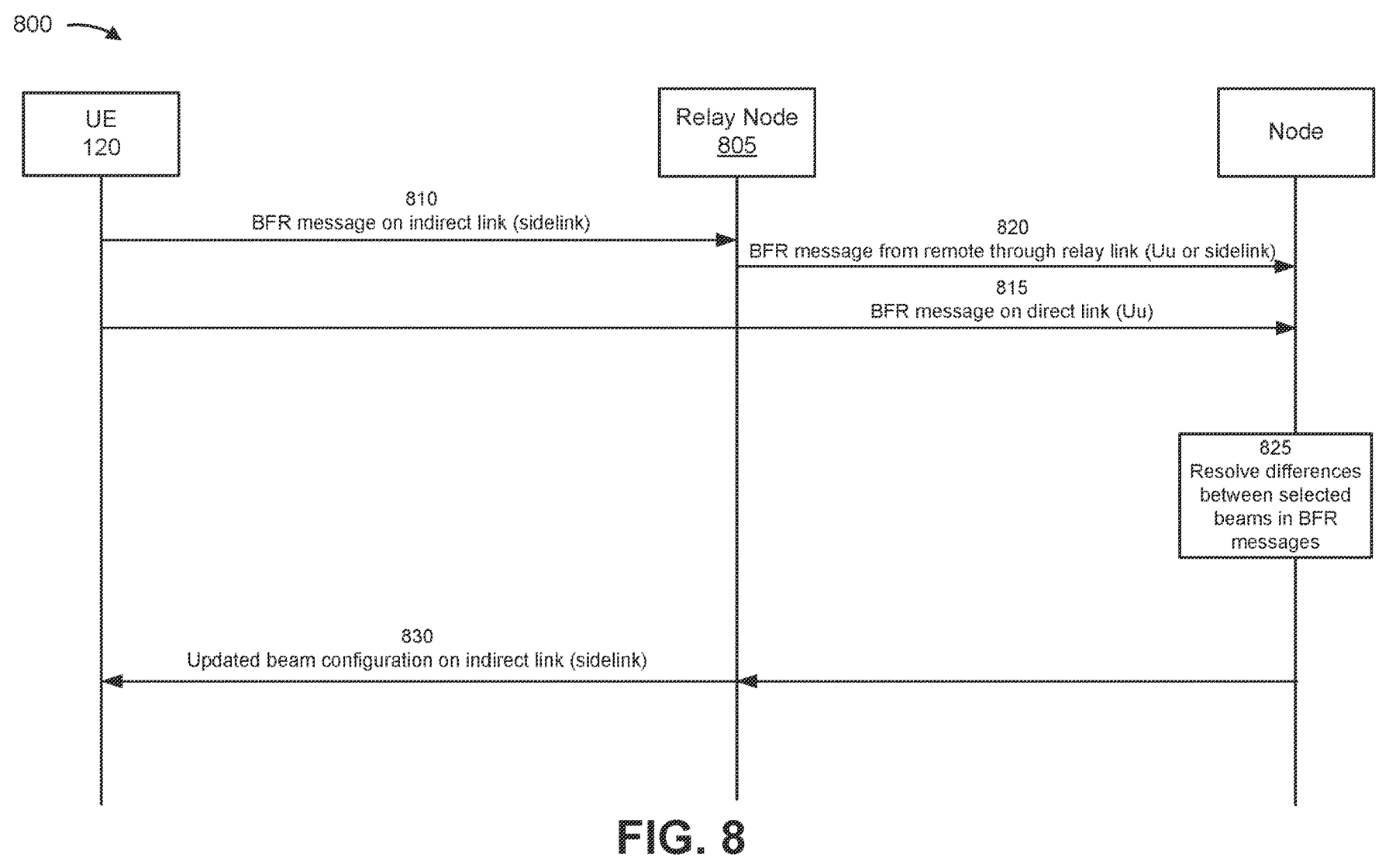

800

UE
120

Relay Node
805

Node

810
BFR message on indirect link (sidelink)

820
BFR message from remote through relay link (Uu or sidelink)

815
BFR message on direct link (Uu)

825
Resolve differences between selected beams in BFR messages

830
Updated beam configuration on indirect link (sidelink)

FIG. 8

900
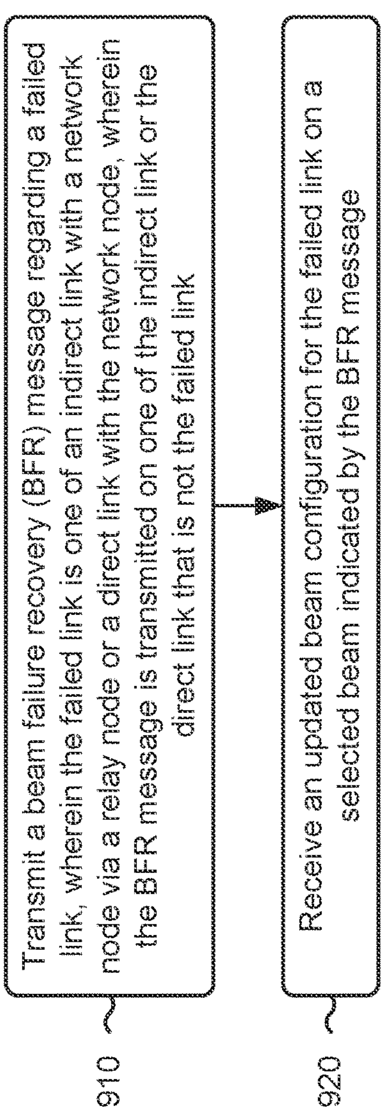

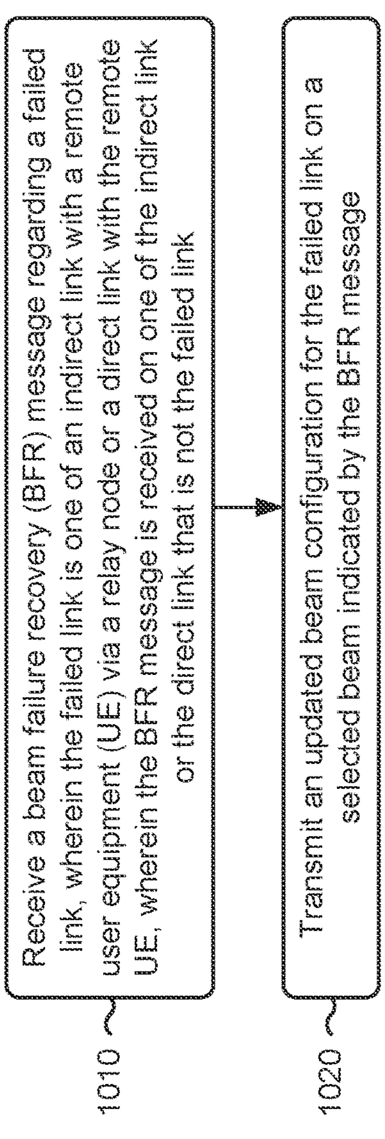
FIG. 10

BEAM FAILURE RECOVERY VIA RELAY NODE

CROSS-REFERENCE TO RELATED APPLICATION

This Patent Application claims priority to U.S. Provisional Patent Application No. 63/380,476, filed on Oct. 21, 2022, entitled "BEAM FAILURE RECOVERY VIA RELAY NODE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam failure recovery (BFR) via a relay node.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting a beam failure recovery (BFR) message regarding a failed link, wherein the failed link is one of an indirect link with a network node via a relay node or a direct link with the network node, wherein the BFR message is transmitted on one of the indirect link or the direct link that is not the failed link. The method may include receiving an updated beam configuration for the failed link on a selected beam indicated by the BFR message.

Some aspects described herein relate to a method of wireless communication performed by a network node. The method may include receiving a BFR message regarding a failed link, wherein the failed link is one of an indirect link with a remote UE via a relay node or a direct link with the remote UE, wherein the BFR message is received on one of the indirect link or the direct link that is not the failed link. The method may include transmitting an updated beam configuration for the failed link on a selected beam indicated by the BFR message.

Some aspects described herein relate to a UE for wireless communication. The UE may include a memory and one or more processors coupled to the memory. The one or more processors may be configured to transmit a BFR message regarding a failed link, wherein the failed link is one of an indirect link with a network node via a relay node or a direct link with the network node, wherein the BFR message is transmitted on one of the indirect link or the direct link that is not the failed link. The one or more processors may be configured to receive an updated beam configuration for the failed link on a selected beam indicated by the BFR message.

Some aspects described herein relate to a network node for wireless communication. The network node may include a memory and one or more processors coupled to the memory. The one or more processors may be configured to receive a BFR message regarding a failed link, wherein the failed link is one of an indirect link with a remote UE via a relay node or a direct link with the remote UE, wherein the BFR message is received on one of the indirect link or the direct link that is not the failed link. The one or more processors may be configured to transmit an updated beam configuration for the failed link on a selected beam indicated by the BFR message.

Some aspects described herein relate to a non-transitory computer-readable medium that stores a set of instructions for wireless communication by a UE. The set of instructions, when executed by one or more processors of the UE, may cause the UE to transmit a BFR message regarding a failed link, wherein the failed link is one of an indirect link with a network node via a relay node or a direct link with the network node, wherein the BFR message is transmitted on one of the indirect link or the direct link that is not the failed link. The set of instructions, when executed by one or more processors of the UE, may cause the UE to receive an updated beam configuration for the failed link on a selected beam indicated by the BFR message.

Some aspects described herein relate to a non-transitory computer-readable medium that stores a set of instructions for wireless communication by a network node. The set of instructions, when executed by one or more processors of the network node, may cause the network node to receive a BFR message regarding a failed link, wherein the failed link is one of an indirect link with a remote UE via a relay node or a direct link with the remote UE, wherein the BFR message is received on one of the indirect link or the direct link that is not the failed link. The set of instructions, when executed by one or more processors of the network node, may cause the network node to transmit an updated beam configuration for the failed link on a selected beam indicated by the BFR message.

Some aspects described herein relate to an apparatus for wireless communication. The apparatus may include means for transmitting a BFR message regarding a failed link, wherein the failed link is one of an indirect link with a network node via a relay node or a direct link with the network node, wherein the BFR message is transmitted on one of the indirect link or the direct link that is not the failed link. The apparatus may include means for receiving an updated beam configuration for the failed link on a selected beam indicated by the BFR message.

Some aspects described herein relate to an apparatus for wireless communication. The apparatus may include means for receiving a BFR message regarding a failed link, wherein the failed link is one of an indirect link with a remote UE via a relay node or a direct link with the remote UE, wherein the BFR message is received on one of the indirect link or the direct link that is not the failed link. The apparatus may include means for transmitting an updated beam configuration for the failed link on a selected beam indicated by the BFR message.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram of an example associated with a BFR procedure via a relay node, in accordance with the present disclosure.

FIG. 9 is a diagram illustrating an example process performed, for example, by a UE, in accordance with the present disclosure.

FIG. 10 is a diagram illustrating an example process performed, for example, by a network node, in accordance with the present disclosure.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
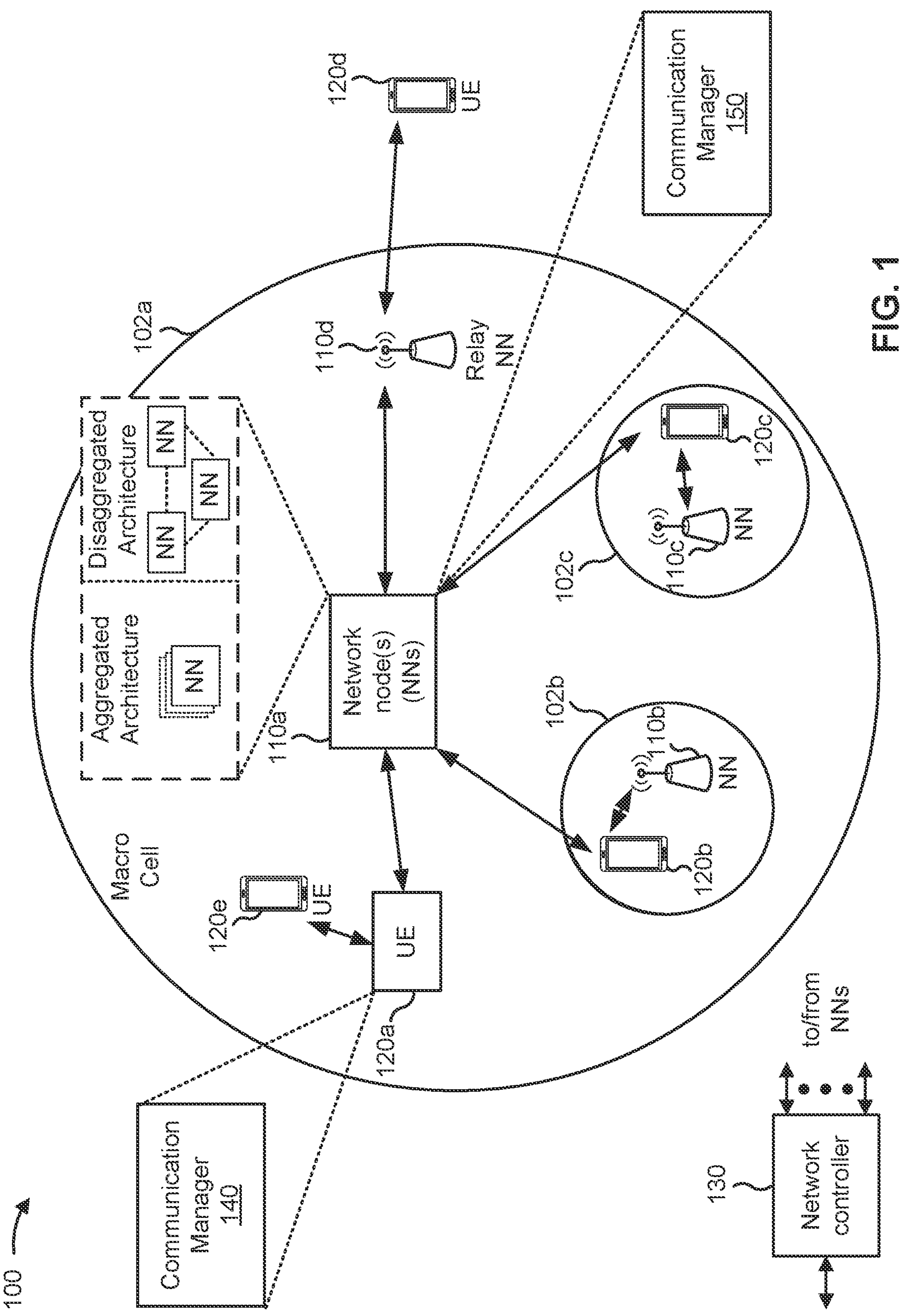
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node **110*d* (e.g., a relay network node) may communicate with the network node 110*a* (e.g., a macro network node) and the UE 120*d* in order to facilitate communication between the network node 110*a* and the UE 120*d*. A network node 110** that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE **120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110**.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit a BFR message regarding a failed link, wherein the failed link is one of an indirect link with a network node via a relay node or a direct link with the network node, wherein the BFR message is transmitted on one of the indirect link or the direct link that is not the failed link; and receive an updated beam configuration for the failed link on a selected beam indicated by the BFR message. Additionally, or alternatively, the communication manager 140 may perform one or more other operations described herein.

In some aspects, the network node 110 may include a communication manager 150. As described in more detail elsewhere herein, the communication manager 150 may receive a BFR message regarding a failed link, wherein the failed link is one of an indirect link with a remote UE via a relay node or a direct link with the remote UE, wherein the BFR message is received on one of the indirect link or the direct link that is not the failed link; and transmit an updated beam configuration for the failed link on a selected beam indicated by the BFR message. Additionally, or alternatively, the communication manager 150 may perform one or more other operations described herein.

As indicated above, FIG. 1 is provided as an example. Other examples may differ from what is described with regard to FIG. 1.

Figure 2:
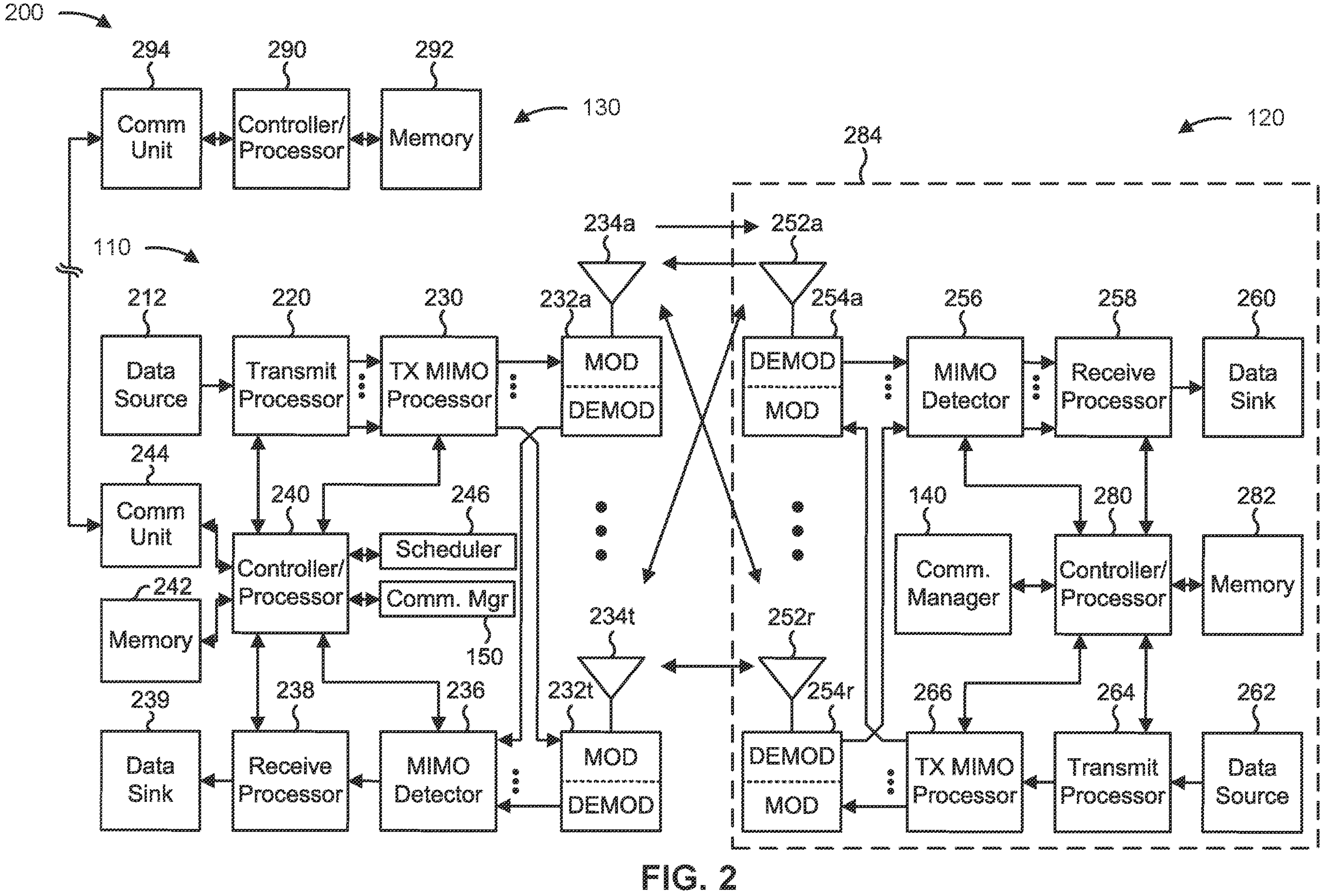
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

The controller/processor 240 of the network node 110, the controller/processor 280 of the UE 120, and/or any other component(s) of FIG. 2 may perform one or more techniques associated with beam failure recovery, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., UE 120) includes means for transmitting a BFR message regarding a failed link, wherein the failed link is one of an indirect link with a network node via a relay node or a direct link with the network node, wherein the BFR message is transmitted on one of the indirect link or the direct link that is not the failed link; and/or means for receiving an updated beam configuration for the failed link on a selected beam indicated by the BFR message. The means for the UE to perform operations described herein may include, for example, one or more of communication manager 140, antenna 252, modem 254, MIMO detector 256, receive processor 258, transmit processor 264, TX MIMO processor 266, controller/processor 280, memory 282, or one or more components of FIG. 4.

In some aspects, a network node (e.g., network node 110) includes means for receiving a BFR message regarding a failed link, wherein the failed link is one of an indirect link with a remote UE via a relay node or a direct link with the remote UE, wherein the BFR message is received on one of the indirect link or the direct link that is not the failed link; and/or means for transmitting an updated beam configuration for the failed link on a selected beam indicated by the BFR message. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, scheduler 246, or one or more components of FIG. 4.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
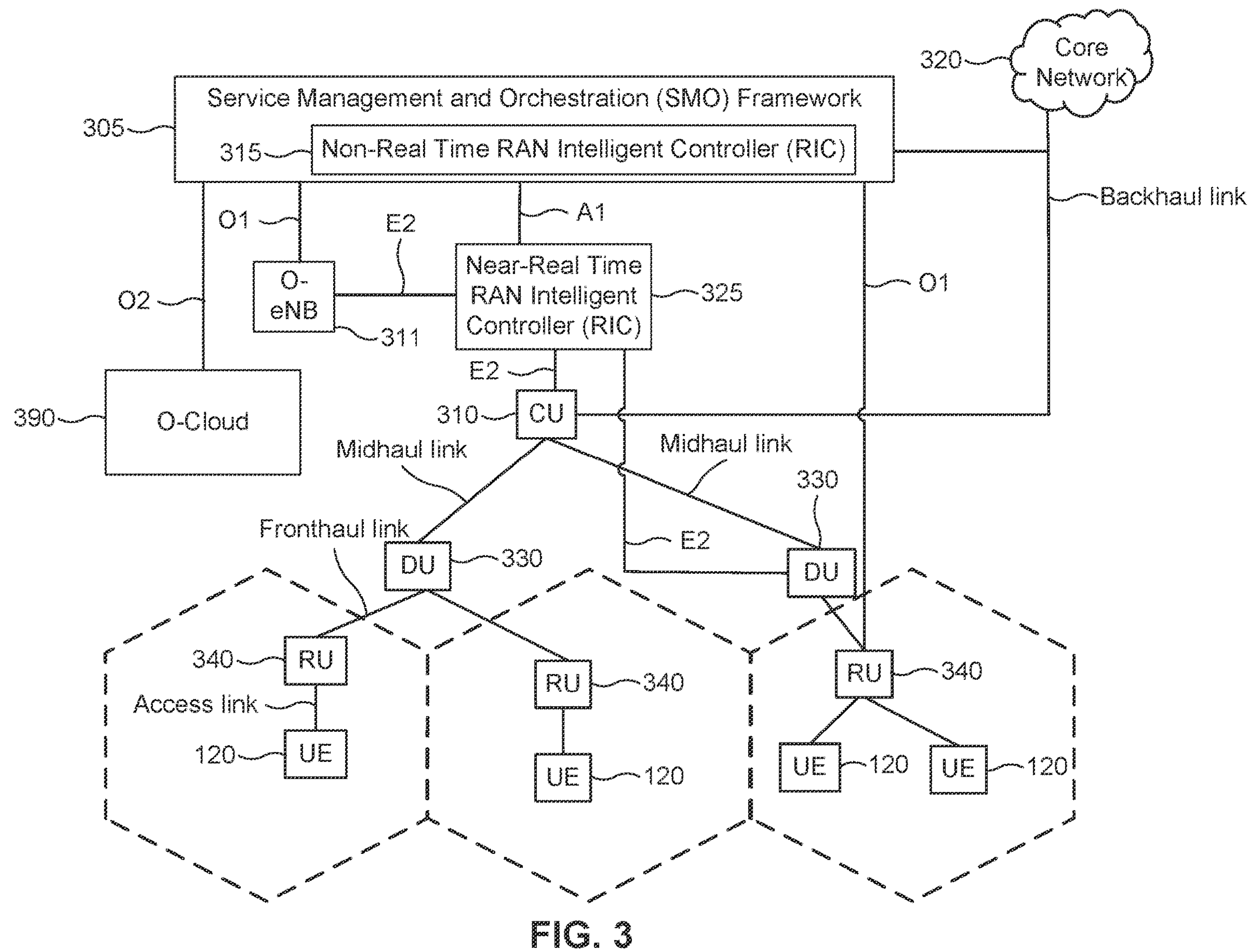
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
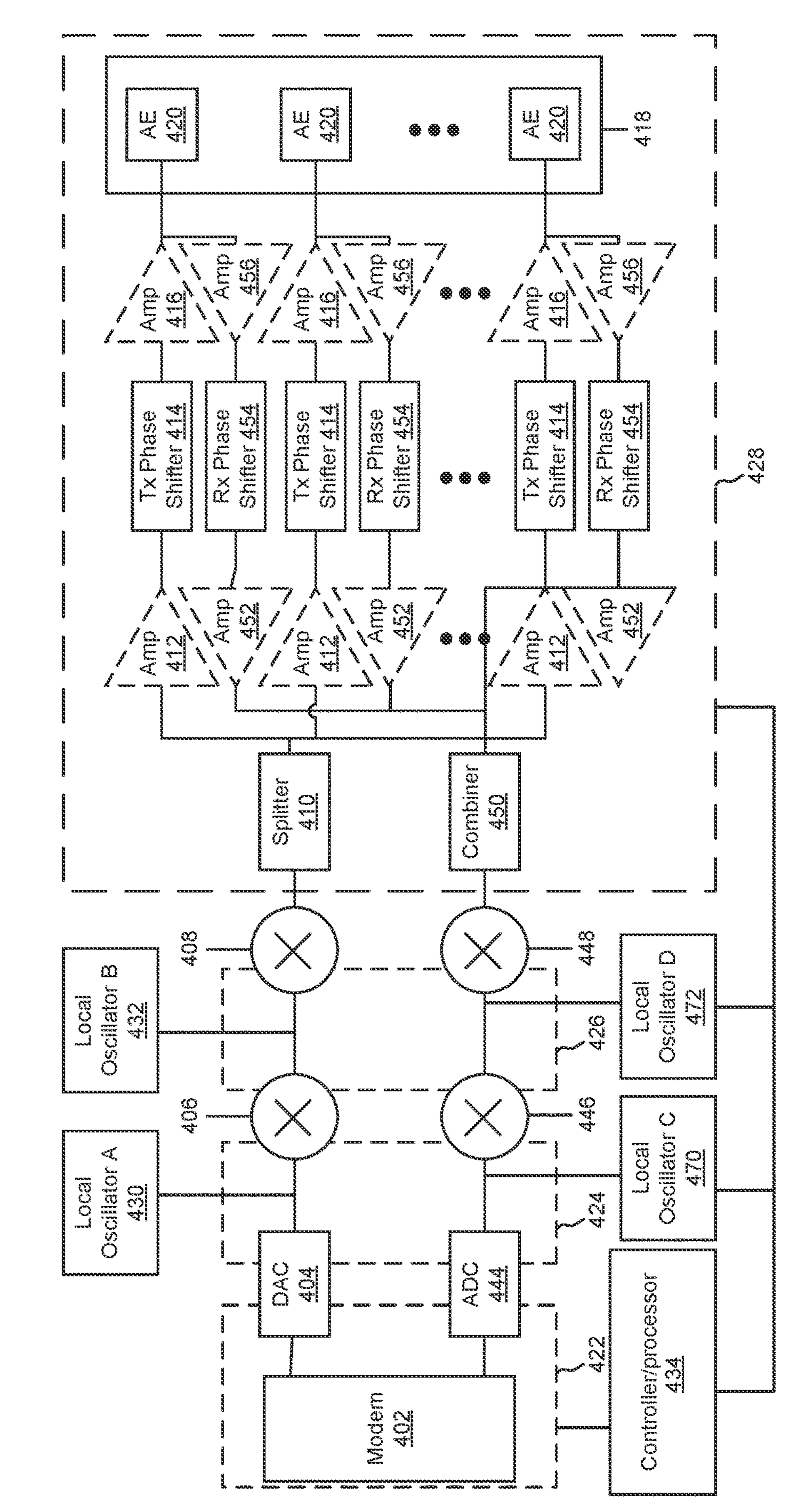
FIG. 4 is a diagram illustrating an example beamforming architecture that supports beamforming for millimeter wave (mmW) communications, in accordance with the present disclosure.

FIG. 4 is a diagram illustrating an example beamforming architecture 400 that supports beamforming for millimeter wave (mmW) communications, in accordance with the present disclosure. In some aspects, architecture 400 may implement aspects of wireless network 100. In some aspects, architecture 400 may be implemented in a transmitting device (e.g., a first wireless communication device, UE, or network node) and/or a receiving device (e.g., a second wireless communication device, UE, or network node), as described herein.

Broadly, FIG. 4 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes multiple first amplifiers 412, multiple phase shifters 414, multiple second amplifiers 416, and an antenna array 418 that includes multiple antenna elements 420. In some examples, the modem 402 may be one or more of the modems 232 or modems 254 described in connection with FIG. 2.

Transmission lines or other waveguides, wires, and/or traces are shown connecting the various components to illustrate how signals to be transmitted may travel between components. Reference numbers 422, 424, 426, and 428 indicate regions in the architecture 400 in which different types of signals travel or are processed. Specifically, reference number 422 indicates a region in which digital baseband signals travel or are processed, reference number 424 indicates a region in which analog baseband signals travel or are processed, reference number 426 indicates a region in which analog intermediate frequency (IF) signals travel or are processed, and reference number 428 indicates a region in which analog RF signals travel or are processed. The architecture also includes a local oscillator A 430, a local oscillator B 432, and a controller/processor 434. In some aspects, controller/processor 434 corresponds to controller/processor 240 of the network node 110 described above in connection with FIG. 2 and/or controller/processor 280 of the UE 120 described above in connection with FIG. 2.

Each of the antenna elements 420 may include one or more sub-elements for radiating or receiving RF signals. For example, a single antenna element 420 may include a first sub-element cross-polarized with a second sub-element that can be used to independently transmit cross-polarized signals. The antenna elements 420 may include patch antennas, dipole antennas, or other types of antennas arranged in a linear pattern, a two dimensional pattern, or another pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similar to the first mixer, the second mixer 408 may mix the signals with an oscillating signal generated by the local oscillator B 432 to "move" the IF analog signals to the RF or the frequency at which signals will be transmitted or received. The modem 402 and/or the controller/processor 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into multiple identical or nearly identical RF signals. In other examples, the split may take place with any type of signal, including with baseband digital, baseband analog, or IF analog signals. Each of these signals may correspond to an antenna element 420, and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some aspects. In some aspects, both the first amplifier 412 and second amplifier 416 are present. In some aspects, neither the first amplifier 412 nor the second amplifier 416 is present. In some aspects, one of the two amplifiers 412, 416 is present but not the other. By way of example, if the splitter 410 is an active splitter, the first amplifier 412 may not be used. By way of further example, if the phase shifter 414 is an active phase shifter that can provide a gain, the second amplifier 416 might not be used.

The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or the controller/processor 434) to provide independent control of the gain for each antenna element 420. For example, the modem 402 and/or the controller/processor 434 may have at least one control line connected to each of the splitter 410, first amplifiers 412, phase shifters 414, and/or second amplifiers 416 that may be used to configure a gain to provide a desired amount of gain for each component and thus each antenna element 420.

The phase shifter 414 may provide a configurable phase shift or phase offset to a corresponding RF signal to be transmitted. The phase shifter 414 may be a passive phase shifter not directly connected to a power supply. Passive phase shifters might introduce some insertion loss. The second amplifier 416 may boost the signal to compensate for the insertion loss. The phase shifter 414 may be an active phase shifter connected to a power supply such that the active phase shifter provides some amount of gain or prevents insertion loss. The settings of each of the phase shifters 414 are independent, meaning that each can be independently set to provide a desired amount of phase shift or the same amount of phase shift or some other configuration. The modem 402 and/or the controller/processor 434 may have at least one control line connected to each of the phase shifters 414 and which may be used to configure the phase shifters 414 to provide a desired amount of phase shift or phase offset between antenna elements 420.

In the illustrated architecture 400, RF signals received by the antenna elements 420 are provided to one or more first amplifiers 456 to boost the signal strength. The first amplifiers 456 may be connected to the same antenna arrays 418 (e.g., for time division duplex (TDD) operations). The first amplifiers 456 may be connected to different antenna arrays 418. The boosted RF signal is input into one or more phase shifters 454 to provide a configurable phase shift or phase offset for the corresponding received RF signal to enable reception via one or more Rx beams. The phase shifter 454 may be an active phase shifter or a passive phase shifter. The settings of the phase shifters 454 are independent, meaning that each can be independently set to provide a desired amount of phase shift or the same amount of phase shift or some other configuration. The modem 402 and/or the controller/processor 434 may have at least one control line connected to each of the phase shifters 454 and which may be used to configure the phase shifters 454 to provide a desired amount of phase shift or phase offset between antenna elements 420 to enable reception via one or more Rx beams.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some aspects. In some aspects, both the amplifier 452 and the amplifier 456 are present. In another aspect, neither the amplifier 452 nor the amplifier 456 are present. In other aspects, one of the amplifiers 452, 456 is present but not the other.

In the illustrated architecture 400, signals output by the phase shifters 454 (via the amplifiers 452 when present) are combined in combiner 450. The combiner 450 in architecture 400 combines the RF signal into a signal. The combiner 450 may be a passive combiner (e.g., not connected to a power source), which may result in some insertion loss. The combiner 450 may be an active combiner (e.g., connected to a power source), which may result in some signal gain. When combiner 450 is an active combiner, it may provide a different (e.g., configurable) amount of gain for each input signal so that the input signals have the same magnitude when they are combined. When combiner 450 is an active combiner, the combiner 450 may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to digital signals. The digital signals output from ADC 444 are input to modem 402 for baseband processing, such as decoding, de-interleaving, or similar operations.

The architecture 400 is given by way of example only to illustrate an architecture for transmitting and/or receiving signals. In some cases, the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 422, 424, 426, 428) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In some aspects of this configuration, there may be multiple IF to RF mixers (e.g., for each antenna element chain) within the second mixer 408, and the local oscillator B 432 may supply different local oscillator signals (with different phase offsets) to each IF to RF mixer.

The modem 402 and/or the controller/processor 434 may control one or more of the other components 404 through 472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the multiple signals relative to each other. The controller/processor 434 may be located partially or fully within one or more other components of the architecture 400. For example, the controller/processor 434 may be located within the modem 402 in some aspects.

As indicated above, FIG. 4 is provided as an example. Other examples may differ from what is described with regard to FIG. 4.

Figure 5:
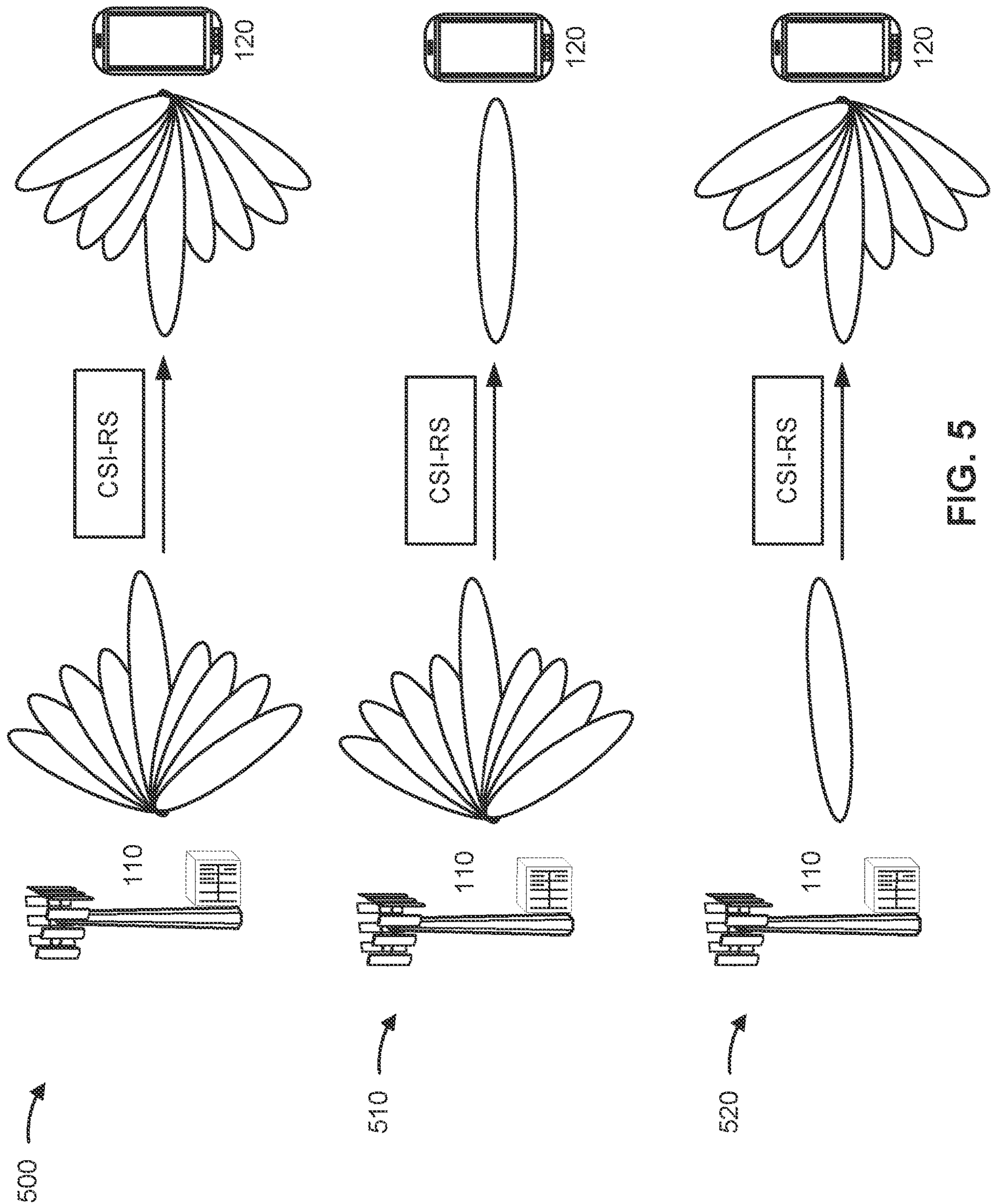
FIG. 5 is a diagram illustrating examples of channel state information reference signal (CSI-RS) beam management procedures, in accordance with the present disclosure.

FIG. 5 is a diagram illustrating examples 500, 510, and 520 of CSI-RS beam management procedures, in accordance with the present disclosure. As shown in FIG. 5, examples 500, 510, and 520 include a UE 120 in communication with a network node 110 in a wireless network (e.g., wireless network 100). However, the devices shown in FIG. 5 are provided as examples, and the wireless network may support communication and beam management between other devices (e.g., between a UE 120 and a network node 110 or TRP, between a mobile termination node and a control node, between an IAB child node and an IAB parent node, and/or between a scheduled node and a scheduling node). In some aspects, the UE 120 and the network node 110 may be in a connected state (e.g., an RRC connected state).

As shown in FIG. 5, example 500 may include a network node 110 (e.g., one or more network node devices such as an RU, a DU, and/or a CU, among other examples) and a UE 120 communicating to perform beam management using CSI-RSs. Example 500 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 5 and example 500, CSI-RSs may be configured to be transmitted from the network node 110 to the UE 120. The CSI-RSs may be configured to be periodic (e.g., using RRC signaling), semi-persistent (e.g., using media access control (MAC) control element (MAC-CE) signaling), and/or aperiodic (e.g., using downlink control information (DCI)).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same RS resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 500 has been described in connection with CSI-RSs, the first beam management process may also use synchronization signal blocks (SSBs) for beam management in a similar manner as described above.

As shown in FIG. 5, example 510 may include a network node 110 and a UE 120 communicating to perform beam management using CSI-RSs. Example 510 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 5 and example 510, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 5, example 520 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 5 and example 520, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

As indicated above, FIG. 5 is provided as an example of beam management procedures. Other examples of beam management procedures may differ from what is described with respect to FIG. 5. For example, the UE 120 and the network node 110 may perform the third beam management procedure before performing the second beam management procedure, and/or the UE 120 and the network node 110 may perform a similar beam management procedure to select a UE transmit beam.

Figure 6:
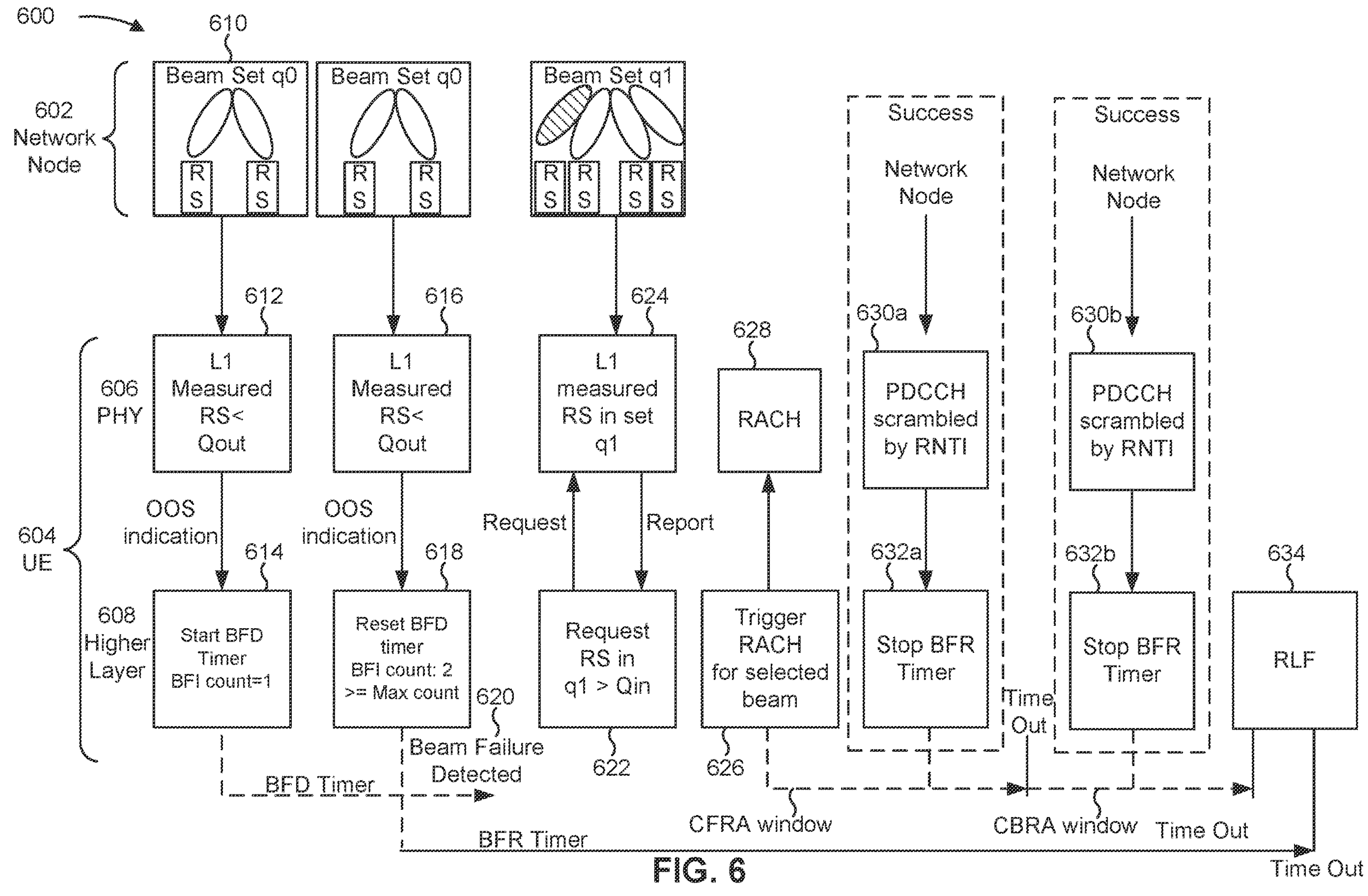
FIG. 6 is a diagram illustrating an example of beam failure detection and beam failure recovery (BFR), in accordance with the present disclosure.

FIG. 6 is a diagram illustrating an example 600 of beam failure detection and beam failure recovery, in accordance with the present disclosure. The beam failure detection (BFD) procedure is shown by reference numbers 612 through 620, and the beam failure recovery (BFR) procedure is shown by reference number 622 through 634.

Example 600 includes operations performed by a network node (e.g., network node 110) and a UE (e.g., UE 120). Operations performed by the network node are shown in the top part of FIG. 6 by reference number 602, and operations performed by the UE are shown in the bottom part of FIG. 6 by reference number 604. Actions of the UE that are performed by a PHY layer of the UE are shown in the row indicated by reference number 606, and actions of the UE that are performed by a higher layer (e.g., MAC, RLC, PDCP, RRC, non access stratum (NAS), Internet Protocol (IP), or the like) are shown in the row indicated by reference number 608.

As shown by reference number 610, the network node may transmit a beam set q0. The beam set q0 may include one or more beams that are each associated with a corresponding reference signal. Thus, the set of reference signals for the beam set q0 may be referred to as a set of BFD reference signals (BFD-RSs). The reference signal may include an SSB, a channel state information reference signal (CSI-RS), or the like.

As shown by reference number 612, the UE may perform a Layer 1 (L1) measurement of the reference signals of the beam set q0. For example, the UE may determine a measurement regarding each reference signal of the beam set q0. The measurement may include an RSRP, RSRQ, a signal to interference and noise ratio (SINR), or the like. As further shown, the UE (e.g., the PHY layer) may determine that the L1 measurement (e.g., the radio link quality) fails to satisfy a first threshold, referred to as Qout. As shown, the UE (e.g., the PHY layer) may provide an out of service (OOS) indication to a higher layer of the UE.

As shown by reference number 614, the UE (e.g., the higher layer) may start a BFD timer based at least in part on the failure of the beams to satisfy Qout and may increment a beam failure indication (BFI) count. If the BFI count satisfies a threshold (shown as "max count" in connection with reference number 618) before the expiration of the BFD timer, then the UE may determine beam failure. If the BFD timer expires before the BFI count satisfies the threshold, then the UE may reset the BFI count, thereby not determining a beam failure.

As shown by reference number 616, the UE (e.g., the PHY layer) may perform a second L1 measurement of the reference signals of the beam set q0. As further shown, the UE may provide an OOS indication to the higher layer of the UE indicating that the second L1 measurement fails to satisfy Qout. If the second L1 measurement had satisfied Qout, then the BFD timer may expire, and the UE 120 may not identify beam failure.

As shown by reference number 618, the UE may reset the BFD timer based at least in part on the second L1 measurement failing to satisfy the threshold and may increment the BFI count. As further shown, the BFI count now satisfies the maximum count threshold. Accordingly, as shown by reference number 620, the UE determines that beam failure is detected.

As shown by reference number 622, the UE (e.g., the higher layer) may request measurement of reference signals on a beam set q1 to identify one or more beams of the beam set q1 that satisfy a second threshold (e.g., Qin, which may be referred to as a BFR threshold). For example, the beam set q1 may be a set of candidate beams, or new beams, for the BFR procedure. Thus, the set of reference signals for the beam set q1 may be referred to as a set of new beam identification reference signals (NBI-RSs).

As shown by reference number 624, the UE (e.g., the PHY layer) may provide (e.g., upon a request from the higher layer) measurement information identifying L1 measurements of reference signals of the beam set q1. In example 600, the measurement information indicates that a particular reference signal associated with a particular beam satisfies Qin. For example, the UE may provide a reference signal index and an L1 measurement (e.g., RSRP) for each of the reference signals associated with an L1 measurement that satisfies the threshold Qin. In FIG. 6, a particular beam is illustrated by diagonal hatching. If the measurement information indicates that the particular reference signal associated with the particular beam satisfies Qin, then the UE may select the particular beam as a selected beam and may attempt to access the selected beam or a cell associated with the selected beam. For example, as shown by reference number 626, the UE (e.g., the higher layer) may trigger (e.g., initiate) a random access channel (RACH) procedure to access the selected beam, and, as shown by reference number 628, the UE (e.g., the PHY layer) may perform the RACH procedure. For example, the UE may provide a RACH Message 1 (e.g., a first message of a RACH procedure) to the network node to access the selected beam. Some techniques described herein provide signaling of a selected beam via non-RACH means, such as a BFR MAC-CE which may be transmitted via an indirect link with a relay node for relaying to a network node, or via a direct link with the network node.

In an example, the UE may initiate random access procedures, beginning with contention-free random access (CFRA), using a random access resource (e.g., a random access preamble index) associated with the particular reference signal (e.g., that satisfies Qin). In the case where the RACH procedure (e.g., CFRA) is successful, the network node 110 may provide a physical downlink control channel (PDCCH) on the selected beam, as shown by reference number 630*a*. In some examples, this response may be a response to the RACH Message 1, such as a RACH Message 2, a random access response (RAR), or the like. As further shown, a cyclic redundancy check (CRC) of DCI of the PDCCH may be scrambled using a radio network temporary identifier (RNTI) (e.g., a cell RNTI (C-RNTI), an MCS cell RNTI (MCS-C-RNTI), or another type of RNTI).

If the UE receives the PDCCH within the CFRA response window, BFR is successful. As shown by reference number 632*a*, the UE may stop the BFR timer based at least in part on the BFR being successful. If CFRA is not successful in the CFRA response window, the UE may perform contention-based random access (CBRA). The UE may perform CBRA using the same selected beam, or a different selected beam, used for performing CFRA. In the case where the RACH procedure (e.g., CBRA) is successful, the network node 110 may provide a PDCCH on the selected beam, as shown by reference number 630*b*, in a similar manner as described above. If the UE receives the PDCCH within the CBRA response window, BFR is successful. As shown by reference number 632*b*, the UE may stop the BFR timer based at least in part on the BFR being successful.

In the case wherein the RACH procedure is unsuccessful (e.g., upon expiration of the CFRA response window and/or the CBRA response window), the UE 120 may determine radio link failure (RLF) after expiration of the BFR timer, as shown by reference number 634. In such a case, the UE 120 may enter an idle mode, may report the RLF, may search for a new cell, or the like.

As indicated above, FIG. 6 is provided as an example. Other examples may differ from what is described with respect to FIG. 6.

Certain BFD and BFR procedures, particularly those that rely primarily on RACH communications, can cause the UE to consume significant power and resources, increase latency, and delay or interrupt communications. For example, BFD and BFR procedures that rely on RACH messages (e.g., messages on a single signaling path) must wait for the next RACH occasion before a RACH message can be sent.

Some techniques described herein provide transmission of a BFR message regarding a failed link for a UE that is associated with a direct link with a network node, and with an indirect link with the network node via a relay node. In some aspects, the UE may transmit a BFR message regarding a failed link, wherein the failed link is one of an indirect link with a network node via a relay node or a direct link with the network node. The BFR message may be transmitted on a remaining link of the indirect link and the direct link other than the failed link. The UE may receive an updated beam configuration for the failed link on a selected beam indicated by the BFR message. In this way, the remote UE does not rely primarily on RACH messages for the BFD and BFR procedures, thereby resulting in reduced power consumption. Moreover, the UE does not need to wait for the network node's next RACH occasion to begin to establish a new beam configuration, thereby decreasing the amount of time to establish a new beam configuration. Still further, these techniques are applicable in cases where the failed link is the indirect link, and where the failed link is the direct link.

In one aspect, a method of wireless communication performed by a network node comprises receiving a BFR message regarding a failed link, wherein the failed link is one of an indirect link with a remote UE via a relay node or a direct link with the remote UE, wherein the BFR message is received on a remaining link of the indirect link and the direct link other than the failed link; and transmitting an updated beam configuration for the failed link on a selected beam indicated by the BFR message. In this aspect, the network node learns about the failed link faster than if the remote UE were to wait for the next RACH occasion. As such, the network node can more quickly establish a new beam configuration with the remote UEs.

Multipath BFR processes can result in an ambiguity concerning the selected beam due to, for example, a time delay between beam measurements. That is, the BFR message on the direct link may identify one selected beam while the BFR message on the indirect link may identify another selected beam. Particularly, depending on the configuration of the BFR procedure as well as a timer threshold in some aspects of the BFR procedure, the network node may receive multiple BFR messages (e.g., multiple BFR MAC-CEs, a BFR MAC-CE and a RACH message) indicating different selected beams. For example, at the time of BFD, the UE may measure candidate beams and may select and indicate b1 as a best beam using a BFR MAC-CE via the relay link.

After a delay of x ms, a next RACH occasion may arrive. The UE may measure the candidate beams again and may select and indicate b2 as a best beam via RACH on beam b2. This ambiguity may lead to delay before an updated beam configuration can be established. For example, the network node may have difficulty telling which beam is the latest best candidate beam (e.g., selected beam) for the UE because of the uncontrollable value of delay x, and the different delays on the direct path and relay path.

Some techniques described herein provide resolution of such ambiguity using techniques such as selecting a beam based on the latest BFR message transmitted, transmitting on multiple beams until the ambiguity is resolved, or having the remote UE and relay node transmit BFR messages identifying the same selected beam. With one or more of these techniques, the network node and remote UE can more quickly resolve or avoid ambiguities resulting from multipath BFR processes.

Figure 7:
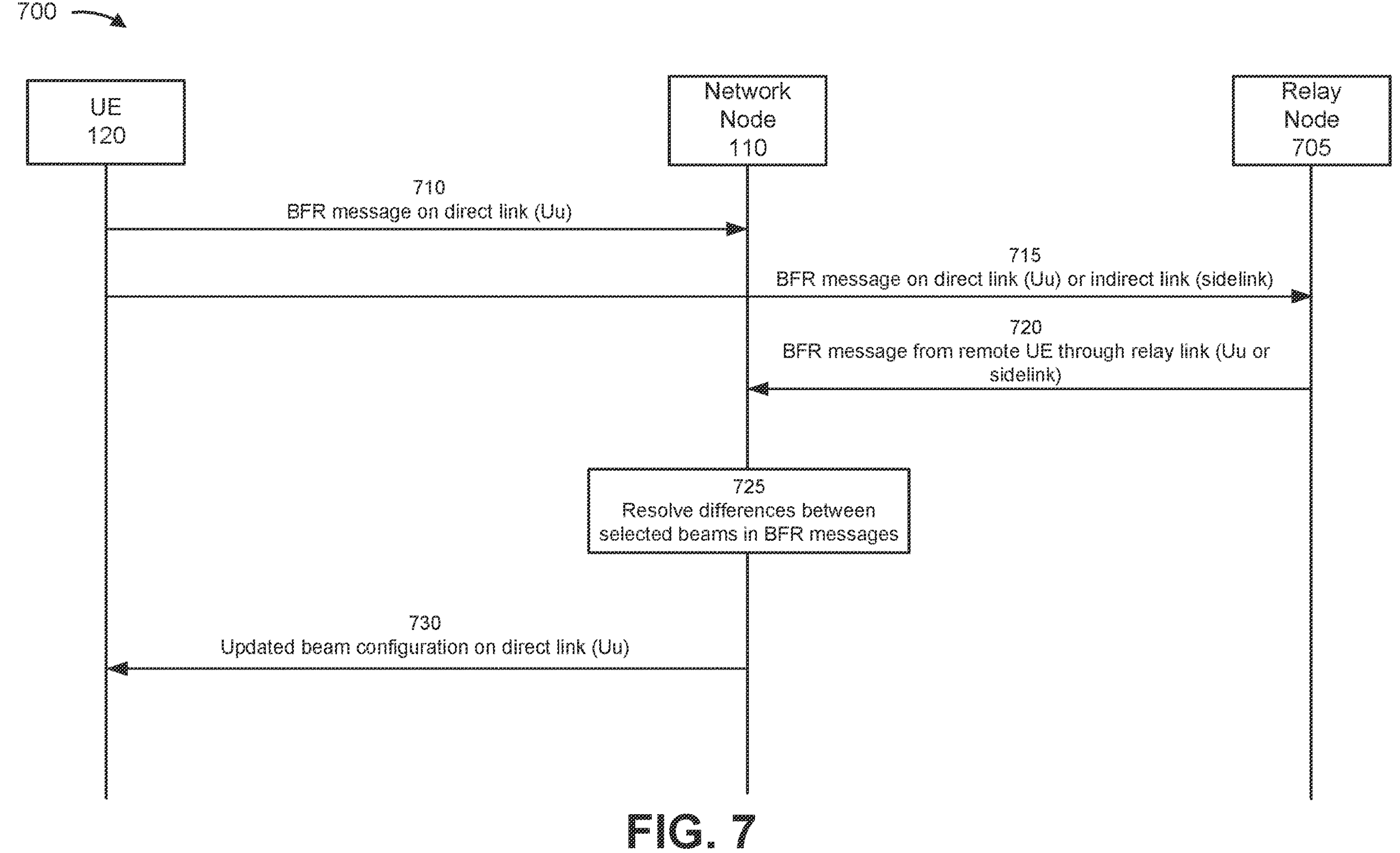
FIG. 7 is a diagram of an example associated with a BFR procedure via a relay node, in accordance with the present disclosure.

FIG. 7 is a diagram of an example 700 associated with a BFR procedure via a relay node 705, in accordance with the present disclosure. As shown in FIG. 7, the remote UE (e.g., UE 120) may communicate with a network node (e.g., network node 110) via a direct link (e.g., a radio access link associated with a Uu interface or the like). The remote UE may communicate with the network node via the relay node 705 (e.g., a different network node 110, a different UE 120, a repeater, a relay) via an indirect link. The indirect link may include a link between the remote UE and the relay node 705 (e.g., a sidelink, a local link, etc., which may or may not utilize beamforming) and/or a link between the relay node 705 and the network node (e.g., a Uu link). In some aspects, the link between the remote UE and the relay node 705, and the link between the relay node 705 and the network node, may be collectively referred to as a relay link. In some aspects, the remote UE may have a direct link with a first RU of the network node, and the relay node 705 may have a direct link with a second RU of the network node. In some aspects, the remote UE, the network node, and the relay node 705 may be part of a wireless network (e.g., wireless network 100). The remote UE, the network node, and the relay node 705 may have established a wireless connection prior to operations shown in FIG. 7. Example 700 assumes a failure on the direct link (e.g., the direct link is the failed link). As used herein, "failed link" includes a link on which the remote UE has detected beam failure. The failed link can be the direct link (in a case where a beam between the remote UE and the network node has failed) or the indirect link (in a case where a beam between the remote UE and the relay node has failed).

As shown by reference number 710, the remote UE may transmit, and the network node may receive, a BFR message (also called a first BFR message) on the direct link. The BFR message may include a BFR message transmitted on a RACH or a BFR message transmitted via a MAC-CE (e.g., a BFR MAC-CE). The BFR message may be created after the remote UE detects a beam failure on the direct link. The beam failure may be detected via a BFD procedure such as the BFD procedure shown at reference numbers 612-620 and discussed above with reference to FIG. 6. The result of the BFD procedure may include a determination by the remote UE that the beam failure is detected. Moreover, the result of the BFD procedure may include the measurement of the beam set q1, discussed above with respect to reference number 622 and shown in FIG. 6, and the selection of the selected beam discussed above with respect to reference number 624 and shown in FIG. 6. In one aspect, the BFR message may identify a first beam as the selected beam. In one aspect, the first BFR message may include a first time stamp. In one aspect, the first time stamp may indicate a time at which the first BFR message was generated. In one aspect, the first time stamp may indicate a time at which the first BFR message was transmitted. In one aspect, the first time stamp may indicate a time at which a beam measurement occurred.

As shown by reference number 715, the remote UE may transmit, and the relay node may receive, a second BFR message on the indirect link. The second BFR message may include a BFR message transmitted on a RACH or a BFR message transmitted via a MAC-CE (e.g., a BFR MAC-CE). In one aspect, the second BFR message may be the same as (e.g., may have the same content as) the first BFR message transmitted on the direct link at reference number 710. For example, the second BFR message transmitted on the indirect link may identify the first beam as the selected beam. In this context, the first BFR message may be considered to be "the same as" the second BFR message even if the first BFR message is transmitted via RACH and the second BFR message is transmitted via MAC-CE (or vice versa). In another aspect, the second BFR message may be different from the first BFR message transmitted on the direct link at reference number 710. For example, the second BFR message may identify a second beam as the selected beam. The remote UE may transmit the second BFR message to the relay node via the indirect link, such as via a sidelink PC5 interface. In one aspect, the second BFR message may include a second time stamp. In one aspect, the second time stamp may indicate a time at which the second BFR message was generated, a time at which the second BFR message was transmitted, or a time at which a beam measurement occurred. In one aspect, the remote UE may transmit the first BFR message on the indirect link and the direct link (e.g., in each FR message until a BFR procedure is complete) to avoid ambiguities, discussed in greater detail below with regard to reference number 725.

As shown by reference number 720, the relay node 705 may transmit, and the network node may receive, the second BFR message (including the second time stamp, if the second time stamp was included in the second BFR message) via a direct link (over the air interface) or an indirect link (via a sidelink interface) between the relay node and the network node. The relay node 705 may relay communications between the remote UE and the network node using any suitable relaying technique, such as Layer 2 UE-to-network relaying (which is accomplished using a Layer 2 identifier of the remote UE), Layer 3 UE-to-network relaying (which is accomplished using a Layer 3 (e.g., IP) identifier of the remote UE), or another form of relaying.

As shown by reference number 725, the network node may resolve one or more beam ambiguities in the first BFR message and the second BFR message (if a beam ambiguity is present). An example beam ambiguity may occur if the first BFR message identifies the first beam as the selected beam and the second BFR message identifies the second beam as the selected beam. In one aspect, the network node may select, as the selected beam, the beam associated with whichever time stamp is later (e.g., based at least in part on comparing the first time stamp to the second time stamp). In another aspect, the network node may resolve the beam ambiguity by transmitting on both the first beam and the second beam until the BFR process is complete. In another aspect, the beam ambiguity may be avoided if the BFR messages transmitted on the direct link and indirect link are the same (e.g., the first BFR message identifying the first beam as the selected beam is transmitted on the direct link to the network node and on the indirect link to the relay node, and the relay node forwards the first BFR message to the network node).

As shown by reference number 730, the network node may transmit, and the remote UE may receive (e.g., monitor for), a BFR response (e.g., a RACH message 2, a RAR, a RACH message B, or another form of signaling) with an updated beam configuration. In some aspects, the updated beam configuration may carry information regarding the beam to be used by the remote UE. In some aspects, the updated beam configuration may be an indication that a selected beam is accepted by the network node. The updated beam configuration may be transmitted on the direct link on the selected beam. In instances where the network node was unable to resolve the beam ambiguity or in instances where resolving the beam ambiguity involves transmitting the updated beam configuration on multiple beams, the network node may transmit the updated beam configuration on the first beam and the second beam. If the first BFR message and the second BFR message each include a timestamp, the UE may monitor a selected beam indicated by a BFR message with a later timestamp. For example, the UE may only monitor the network node's response from a latest selected beam indicated by the UE's BFR reporting (either via the BFR MAC-CE or the RACH transmission).

In some aspects, the order of operations shown in FIG. 7 may be different. For example, the transmissions shown by reference numbers 710 and 715/720 may occur in parallel (e.g., at the same time, at substantially the same time). In other aspects, the remote UE may be configured to wait a time period after sending the first BFR message at reference number 710 before sending the second BFR message shown by reference number 715 (e.g., the transmission of the first BFR message may be separated from the transmission of the second BFR message by the time period). In some aspects, the remote UE may be configured to send the second BFR message if no BFR response is received from the network node within the time period.

In some aspects, the remote UE may transmit the second BFR message at reference number 715 before sending the first BFR message at reference number 710. In some aspects, the remote UE may be configured to wait a time period after sending the second BFR message at reference number 715 and before sending the first BFR message shown by reference number 710. In some aspects, the remote UE may be configured to send the first BFR message if no BFR response is received from the network node within the time period.

In some aspects, the network node may respond to every BFR message, including the first BFR message and the second BFR message, until the BFR process is complete. The network node may respond to the first BFR message on the direct link and the second BFR message on a relay link (e.g., a direct link to the relay node and an indirect link between the relay node and the remote UE).

In some aspects, the network node may configure the remote UE to apply techniques discussed above (e.g., via RRC signaling or another form of signaling). For example, the network node may configure the UE to send the first BFR message on the direct link and the second BFR message on the indirect link in parallel, to send the first BFR message on the direct link before sending the second BFR message on the indirect link, to send the second BFR message on the indirect link before sending the first BFR message on the direct link, the time period between sending the first and second BFR messages, and so on. The network node may configure the remote UE to apply these different techniques based on various characteristics such as quality of service (QoS), UE capability, UE capacity, and so on. In some aspects, the network node may configure multiple different configurations, and may indicate a selected configuration from the multiple different configurations via subsequent signaling (such as MAC signaling or DCI).

The example 700 improves latency and reduces power consumption of the UE following detection of a beam failure. The example 700 further allows the network node and remote UE to more quickly resolve or avoid ambiguities resulting from multipath BFR processes.

As indicated above, FIG. 7 is provided as an example. Other examples may differ from what is described with respect to FIG. 7.

FIG. 8 is a diagram of an example 800 associated with a BFR procedure via a relay node 805, in accordance with the present disclosure. As shown in FIG. 8, the first UE (e.g., UE 120) may communicate with a node (e.g., network node 110, a second UE 120) on an indirect link and the relay node 805 (e.g., a network node 110 or a different UE other than UE 120) on a direct link or an indirect link. In some aspects, the first UE, the node, and the relay node 805 may be part of a wireless network (e.g., wireless network 100). The first UE, the node, and the relay node 805 may have established a wireless connection prior to operations shown in FIG. 8. Example 800 assumes a failure on the indirect link (e.g., the indirect link is the failed link).

As shown by reference number 810, the first UE may transmit, and the node may receive, a BFR message (also called a first BFR message) on the indirect link (e.g., sidelink). The BFR message may be created after the first UE detects a beam failure on the indirect link. In one aspect, the BFR message may identify a first beam as the selected beam. In one aspect, the first BFR message may include a first time stamp. In one aspect, the first time stamp may indicate a time at which the first BFR message was generated, a time at which the first BFR message was transmitted, or a time at which a beam measurement occurred. In some aspects, the first BFR message may be transmitted via a RACH communication.

As shown by reference number 815, the first UE may transmit, and the relay node may receive, a second BFR message on the direct link. In one aspect, the second BFR message may be the same as the first BFR message transmitted on the indirect link at reference number 810. That is, the second BFR message transmitted on the direct link may identify the first beam as the selected beam. In another aspect, the second BFR message may be different from the first BFR message transmitted on the indirect link at reference number 810. As such, the second BFR message may identify a second beam as the selected beam. The first UE may transmit the second BFR message to the relay node via the direct link. In one aspect, the second BFR message may include a second time stamp. In one aspect, the second time stamp may indicate a time at which the second BFR message was generated, a time at which the second BFR message was transmitted, or a time at which a beam measurement occurred. In one aspect, the first UE may transmit the first BFR message on the direct link and the indirect link to avoid ambiguities, discussed in greater detail below with regard to reference number 825.

As shown by reference number 820, the relay node may transmit, and the node may receive, the second BFR message via the indirect link (over a sidelink PC5 interface) or a direct link (via an air interface such as a radio access link) between the relay node and the node.

As shown by reference number 825, the node may resolve one or more beam ambiguities in the first BFR message and the second BFR message. An example beam ambiguity may occur if the first BFR message identifies the first beam as the selected beam and the second BFR message identifies the second beam as the selected beam. In one aspect, the node may compare the first time stamp to the second time stamp and select, as the selected beam, the beam associated with whichever time stamp is later. In another aspect, the node may resolve the beam ambiguity by transmitting on both the first beam and the second beam until the BFR process is complete. In another aspect, the beam ambiguity may be avoided if the BFR messages transmitted on the direct link and indirect link are the same (i.e., the first BFR message identifying the first beam as the selected beam is transmitted on the direct link to the node and on the indirect link to the relay node, and the relay node forwards the first BFR message to the node).

As shown by reference number 830, the node may transmit, and the first UE may receive, a BFR response with an updated beam configuration. The updated beam configuration may be transmitted on the direct link on the selected beam. In instances where the node was unable to resolve the beam ambiguity or in instances where resolving the beam ambiguity involves transmitting the updated beam configuration on multiple beams, the node may transmit the updated beam configuration on the first beam and the second beam.

In some aspects, the order of operations shown in FIG. 8 may be different. For example, the transmissions shown by reference numbers 810 and 815/820 may occur in parallel. In other aspects, the first UE may be configured to wait a time period after sending the first BFR message at reference number 810 and before sending the second BFR message at reference number 815. In some aspects, the first UE may be configured to send the second BFR message if no BFR response is received from the node within the time period.

In some aspects, the node may respond to every BFR message from the first UE, including the first message and the second message, until the BFR process is complete. The node may respond to the first BFR message on the indirect link and the second BFR message on a relay link (e.g., a direct or indirect link to the relay node and a direct or indirect link between the relay node and the remote UE).

Alternatively, in some aspects, the first UE may transmit the second BFR message at reference number 815 before sending the first BFR message at reference number 810. In some aspects, the first UE may be configured to wait a time period after sending the second BFR message at reference number 815 and before sending the first BFR message at reference number 810. In some aspects, the first UE may be configured to send the first BFR message if no BFR response is received from the node within the time period.

The example 800 improves latency and reduces power consumption of the first UE following detection of a beam failure. The example 700 further allows the first UE and node to more quickly resolve or avoid ambiguities resulting from multipath BFR processes.

As indicated above, FIG. 8 is provided as an example. Other examples may differ from what is described with respect to FIG. 8.

FIG. 9 is a diagram illustrating an example process 900 performed, for example, by a UE, in accordance with the present disclosure. Example process 900 is an example where the UE (e.g., UE 120, the remote UE of FIGS. 7 and 8) performs operations associated with beam failure recovery via relay node.

As shown in FIG. 9, in some aspects, process 900 may include transmitting a BFR message regarding a failed link, wherein the failed link is one of an indirect link with a network node via a relay node or a direct link with the network node, wherein the BFR message is transmitted on one of the indirect link or the direct link that is not the failed link (block 910). For example, the UE (e.g., using communication manager 140 and/or transmission component 1104, depicted in FIG. 11) may transmit a BFR message regarding a failed link, wherein the failed link is one of an indirect link with a network node via a relay node or a direct link with the network node, wherein the BFR message is transmitted on one of the indirect link or the direct link that is not the failed link, as described above.

As further shown in FIG. 9, in some aspects, process 900 may include receiving an updated beam configuration for the failed link on a selected beam indicated by the BFR message (block 920). For example, the UE (e.g., using communication manager 140 and/or reception component 1102, depicted in FIG. 11) may receive an updated beam configuration for the failed link on a selected beam indicated by the BFR message, as described above.

Process 900 may include additional aspects, such as any single aspect or any combination of aspects described below and/or in connection with one or more other processes described elsewhere herein.

In a first aspect, process 900 includes waiting a time period for a BFR response on the indirect link after transmitting the BFR message.

In a second aspect, alone or in combination with the first aspect, process 900 includes transmitting a second BFR message on the direct link if no BFR response is received on the indirect link within the time period.

In a third aspect, alone or in combination with one or more of the first and second aspects, process 900 includes transmitting a prior BFR message on the direct link before transmitting the BFR message on the indirect link.

In a fourth aspect, alone or in combination with one or more of the first through third aspects, process 900 includes waiting a time period for a BFR response on the direct link, and the BFR message is transmitted on the indirect link as a result of no BFR response to the prior BFR message being received within the time period.

In a fifth aspect, alone or in combination with one or more of the first through fourth aspects, the BFR message includes a first BFR message transmitted on the direct link and indicating a first beam and a second BFR message transmitted on the indirect link and indicating a second beam, wherein one of the first beam or the second beam is the selected beam.

In a sixth aspect, alone or in combination with one or more of the first through fifth aspects, the first BFR message and the second BFR message are transmitted in parallel.

In a seventh aspect, alone or in combination with one or more of the first through sixth aspects, at least one of the first BFR message or the second BFR message includes a time stamp.

In an eighth aspect, alone or in combination with one or more of the first through seventh aspects, process 900 includes selecting, from one of the first beam or the second beam, the selected beam based at least in part on the time stamp.

In a ninth aspect, alone or in combination with one or more of the first through eighth aspects, process 900 includes monitoring, prior to receiving the updated beam configuration, the first beam and the second beam for communications from the network node.

In a tenth aspect, alone or in combination with one or more of the first through ninth aspects, the first beam and the second beam are monitored until the updated beam configuration from the network node is received on the selected beam.

In an eleventh aspect, alone or in combination with one or more of the first through tenth aspects, the first BFR message and the second BFR message both indicate the selected beam.

In a twelfth aspect, alone or in combination with one or more of the first through eleventh aspects, process 900 includes reporting, in each BFR message until a BFR procedure is complete, the selected beam.

In a thirteenth aspect, alone or in combination with one or more of the first through twelfth aspects, the BFR message is transmitted on the indirect link via a sidelink communication.

In a fourteenth aspect, alone or in combination with one or more of the first through thirteenth aspects, the direct link is the failed link.

In a fifteenth aspect, alone or in combination with one or more of the first through fourteenth aspects, the BFR message is transmitted on the direct link via an RACH transmission.

In a sixteenth aspect, alone or in combination with one or more of the first through fifteenth aspects, the indirect link is the failed link.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a network node, in accordance with the present disclosure. Example process 1000 is an example where the network node (e.g., network node 110, the node of FIG. 8, the network node of FIG. 7) performs operations associated with beam failure recovery via relay node.

As shown in FIG. 10, in some aspects, process 1000 may include receiving a BFR message regarding a failed link, wherein the failed link is one of an indirect link with a remote UE via a relay node or a direct link with the remote UE, wherein the BFR message is received on one of the indirect link or the direct link that is not the failed link (block 1010). For example, the network node (e.g., using communication manager 150 and/or reception component 1202, depicted in FIG. 12) may receive a BFR message regarding a failed link, wherein the failed link is one of an indirect link with a remote UE (e.g., the remote UE of FIGS. 7-8) via a relay node or a direct link with the remote UE, wherein the BFR message is received on one of the indirect link or the direct link that is not the failed link, as described above.

As further shown in FIG. 10, in some aspects, process 1000 may include transmitting an updated beam configuration for the failed link on a selected beam indicated by the BFR message (block 1020). For example, the network node (e.g., using communication manager 150 and/or transmission component 1204, depicted in FIG. 12) may transmit an updated beam configuration for the failed link on a selected beam indicated by the BFR message, as described above.

Process 1000 may include additional aspects, such as any single aspect or any combination of aspects described below and/or in connection with one or more other processes described elsewhere herein.

In a first aspect, process 1000 includes receiving the BFR message on the direct link before receiving the BFR message on the indirect link.

In a second aspect, alone or in combination with the first aspect, the BFR message includes a first BFR message on the direct link and indicating a first beam and a second BFR message on the indirect link and indicating a second beam, wherein one of the first beam or the second beam is the selected beam.

In a third aspect, alone or in combination with one or more of the first and second aspects, at least one of the first BFR message or the second BFR message includes a time stamp.

In a fourth aspect, alone or in combination with one or more of the first through third aspects, process 1000 includes selecting, from one of the first beam or the second beam, the selected beam based at least in part on the time stamp.

In a fifth aspect, alone or in combination with one or more of the first through fourth aspects, the first BFR message and the second BFR message both indicate the selected beam.

In a sixth aspect, alone or in combination with one or more of the first through fifth aspects, the updated beam configuration is transmitted on the first beam and the second beam.

In a seventh aspect, alone or in combination with one or more of the first through sixth aspects, process 1000 includes responding to each BFR message from the remote UE until a BFR procedure is complete.

In an eighth aspect, alone or in combination with one or more of the first through seventh aspects, the BFR message is received on the indirect link via a sidelink communication.

In a ninth aspect, alone or in combination with one or more of the first through eighth aspects, the direct link is the failed link.

In a tenth aspect, alone or in combination with one or more of the first through ninth aspects, the BFR message is received on the direct link via an RACH transmission.

In an eleventh aspect, alone or in combination with one or more of the first through tenth aspects, the indirect link is the failed link.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
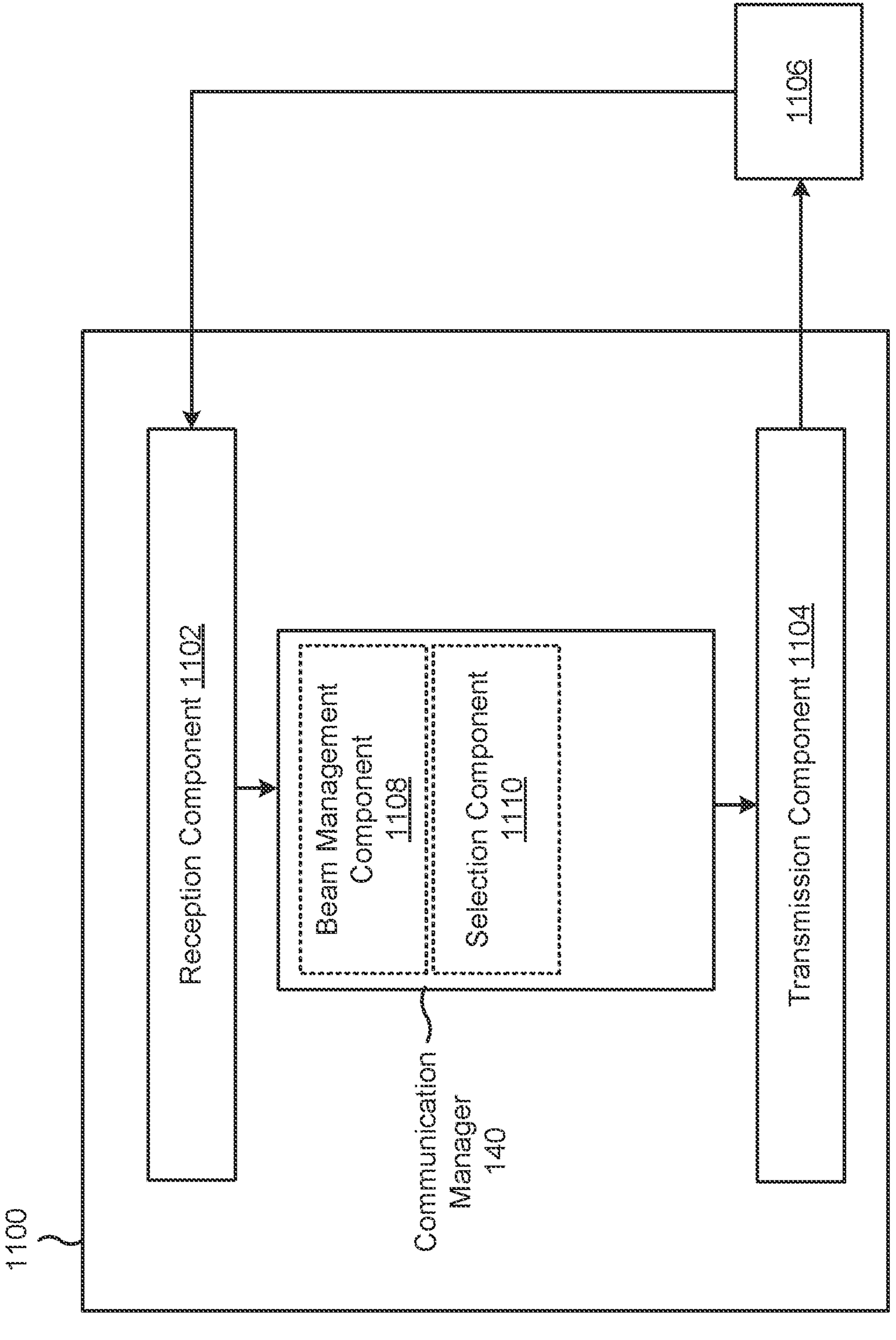
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE (e.g., a remote UE), or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a beam management component 1108 or a monitoring component 1110, among other examples.

In some aspects, the apparatus 1100 may be configured to perform one or more operations described herein in connection with FIGS. 7-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The transmission component 1104 may transmit a BFR message regarding a failed link, wherein the failed link is one of an indirect link with a network node via a relay node or a direct link with the network node, wherein the BFR message is transmitted on one of the indirect link or the direct link that is not the failed link. The reception component 1102 or the beam management component 1108 may receive an updated beam configuration for the failed link on a selected beam indicated by the BFR message.

The reception component 1102 may wait a time period for a BFR response on the indirect link after transmitting the BFR message.

The transmission component 1104 may transmit a second BFR message on the direct link if no BFR response is received on the indirect link within the time period.

The transmission component 1104 may transmit a prior BFR message on the direct link before transmitting the BFR message on the indirect link.

The reception component 1102 may wait a time period for a BFR response on the direct link.

The beam management component 1108 may select, from one of the first beam or the second beam, the selected beam based at least in part on the time stamp.

The monitoring component 1110 may monitor, prior to receiving the updated beam configuration, the first beam and the second beam for communications from the network node.

The transmission component 1104 may report, in each BFR message until a BFR procedure is complete, the selected beam.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
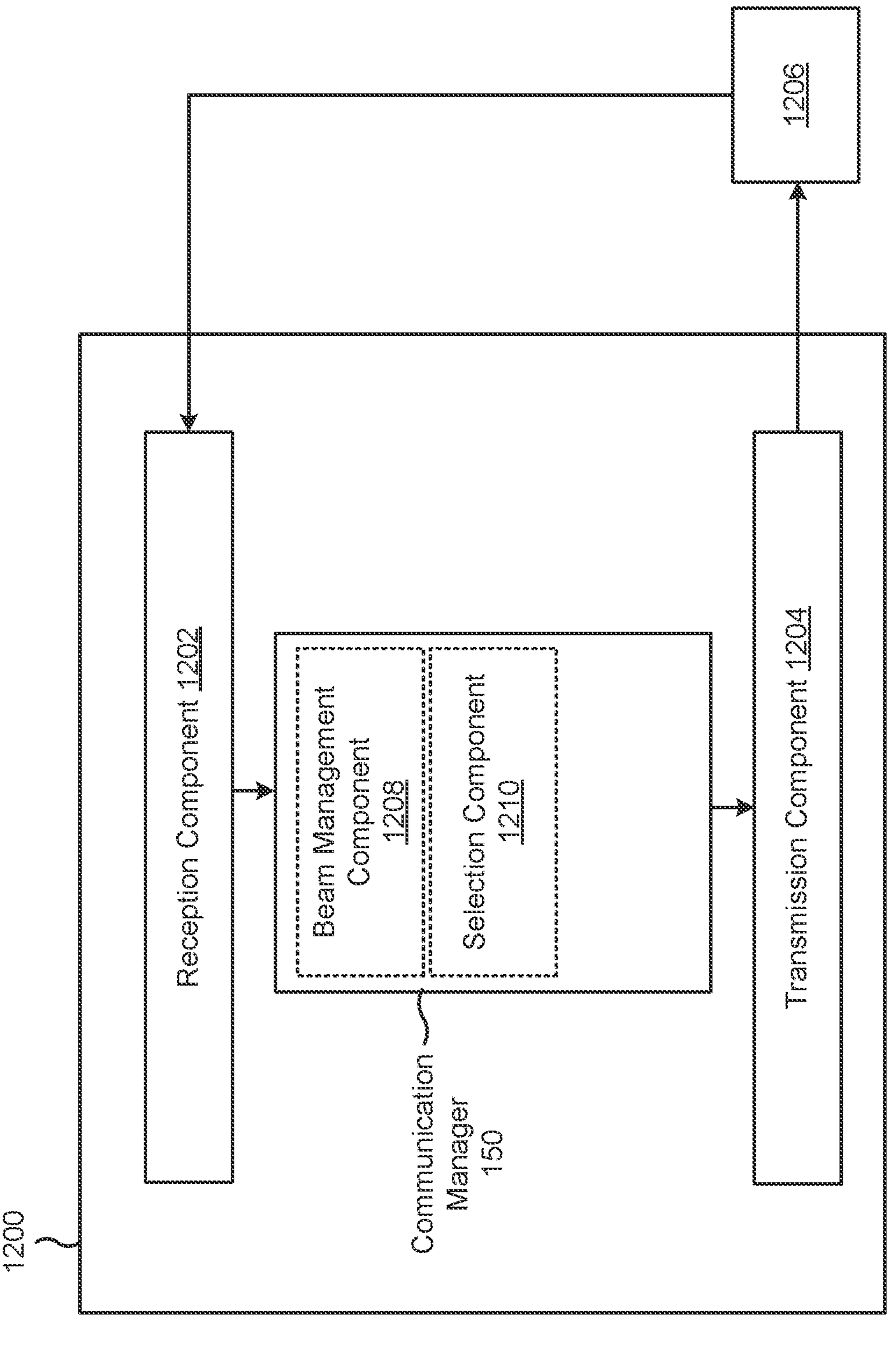
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include one or more of a beam management component 1208 or a selection component 1210, among other examples.

In some aspects, the apparatus 1200 may be configured to perform one or more operations described herein in connection with FIGS. 7-8. Additionally, or alternatively, the apparatus 1200 may be configured to perform one or more processes described herein, such as process 1000 of FIG. 10 or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The reception component 1202 may receive a BFR message regarding a failed link, wherein the failed link is one of an indirect link with a remote UE via a relay node or a direct link with the remote UE, wherein the BFR message is received on one of the indirect link or the direct link that is not the failed link. The transmission component 1204 may transmit an updated beam configuration for the failed link on a selected beam indicated by the BFR message.

The reception component 1202 may receive the BFR message on the direct link before receiving the BFR message on the indirect link.

The selection component 1210 may select, from one of the first beam or the second beam, the selected beam based at least in part on the time stamp.

The beam management component 1208 may respond to each BFR message from the remote UE until a BFR procedure is complete.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: transmitting a beam failure recovery (BFR) message regarding a failed link, wherein the failed link is one of an indirect link with a network node via a relay node or a direct link with the network node, wherein the BFR message is transmitted on one of the indirect link or the direct link that is not the failed link; and receiving an updated beam configuration for the failed link on a selected beam indicated by the BFR message.

Aspect 2: The method of Aspect 1, further comprising waiting a time period for a BFR response on the indirect link after transmitting the BFR message.

Aspect 3: The method of Aspect 2, further comprising transmitting a second BFR message on the direct link if no BFR response is received on the indirect link within the time period.

Aspect 4: The method of any of Aspects 1-3, further comprising transmitting a prior BFR message on the direct link before transmitting the BFR message on the indirect link.

Aspect 5: The method of Aspect 4, further comprising waiting a time period for a BFR response on the direct link, and wherein the BFR message is transmitted on the indirect link as a result of no BFR response to the prior BFR message being received within the time period.

Aspect 6: The method of any of Aspects 1-5, wherein the BFR message includes a first BFR message transmitted on the direct link and indicating a first beam and a second BFR message transmitted on the indirect link and indicating a second beam, wherein one of the first beam or the second beam is the selected beam.

Aspect 7: The method of Aspect 6, wherein the first BFR message and the second BFR message are transmitted in parallel.

Aspect 8: The method of Aspect 6, wherein at least one of the first BFR message or the second BFR message includes a time stamp.

Aspect 9: The method of Aspect 8, further comprising selecting, from one of the first beam or the second beam, the selected beam based at least in part on the time stamp.

Aspect 10: The method of Aspect 6, further comprising monitoring, prior to receiving the updated beam configuration, the first beam and the second beam for communications from the network node.

Aspect 11: The method of Aspect 10, wherein the first beam and the second beam are monitored until the updated beam configuration from the network node is received on the selected beam.

Aspect 12: The method of Aspect 6, wherein the first BFR message and the second BFR message both indicate the selected beam.

Aspect 13: The method of any of Aspects 1-12, further comprising reporting, in each BFR message until a BFR procedure is complete, the selected beam.

Aspect 14: The method of any of Aspects 1-13, wherein the BFR message is transmitted on the indirect link via a sidelink communication.

Aspect 15: The method of any of Aspects 1-14, wherein the direct link is the failed link.

Aspect 16: The method of any of Aspects 1-15, wherein the BFR message is transmitted on the direct link via a random access channel (RACH) transmission.

Aspect 17: The method of any of Aspects 1-16, wherein the indirect link is the failed link.

Aspect 18: A method of wireless communication performed by a network node, comprising: receiving a beam failure recovery (BFR) message regarding a failed link, wherein the failed link is one of an indirect link with a remote user equipment (UE) via a relay node or a direct link with the remote UE, wherein the BFR message is received on one of the indirect link or the direct link that is not the failed link; and transmitting an updated beam configuration for the failed link on a selected beam indicated by the BFR message.

Aspect 19: The method of Aspect 18, further comprising receiving the BFR message on the direct link before receiving the BFR message on the indirect link.

Aspect 20: The method of any of Aspects 18-19, wherein the BFR message includes a first BFR message on the direct link and indicating a first beam and a second BFR message on the indirect link and indicating a second beam, wherein one of the first beam or the second beam is the selected beam.

Aspect 21: The method of Aspect 20, wherein at least one of the first BFR message or the second BFR message includes a time stamp.

Aspect 22: The method of Aspect 21, further comprising selecting, from one of the first beam or the second beam, the selected beam based at least in part on the time stamp.

Aspect 23: The method of Aspect 20, wherein the first BFR message and the second BFR message both indicate the selected beam.

Aspect 24: The method of Aspect 20, wherein the updated beam configuration is transmitted on the first beam and the second beam.

Aspect 25: The method of any of Aspects 18-24, further comprising responding to each BFR message from the remote UE until a BFR procedure is complete.

Aspect 26: The method of any of Aspects 18-25, wherein the BFR message is received on the indirect link via a sidelink communication.

Aspect 27: The method of any of Aspects 18-26, wherein the direct link is the failed link.

Aspect 28: The method of any of Aspects 18-27, wherein the BFR message is received on the direct link via a random access channel (RACH) transmission.

Aspect 29: The method of any of Aspects 18-28, wherein the indirect link is the failed link.

Aspect 30: An apparatus for wireless communication at a device, comprising a processor; memory coupled with the processor; and instructions stored in the memory and executable by the processor to cause the apparatus to perform the method of one or more of Aspects 1-29.

Aspect 31: A device for wireless communication, comprising a memory and one or more processors coupled to the memory, the one or more processors configured to perform the method of one or more of Aspects 1-29.

Aspect 32: An apparatus for wireless communication, comprising at least one means for performing the method of one or more of Aspects 1-29.

Aspect 33: A non-transitory computer-readable medium storing code for wireless communication, the code comprising instructions executable by a processor to perform the method of one or more of Aspects 1-29.

Aspect 34: A non-transitory computer-readable medium storing a set of instructions for wireless communication, the set of instructions comprising one or more instructions that, when executed by one or more processors of a device, cause the device to perform the method of one or more of Aspects 1-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z.

What is claimed is:

1. A user equipment (UE) for wireless communication, comprising:

a memory; and one or more processors, coupled to the memory, individually or collectively configured to:

transmit a beam failure recovery (BFR) message regarding a failed link, wherein the failed link is one of an indirect link with a network node via a relay node or a direct link with the network node, wherein the BFR message is transmitted on one of the indirect link or the direct link that is not the failed link;

wait a time period for a BFR response on the indirect link after transmitting the BFR message;

transmit a second BFR message on the direct link if no BFR response is received on the indirect link within the time period; and receive an updated beam configuration for the failed link on a selected beam indicated by the BFR message.

2. The UE of claim 1, wherein the one or more processors are further individually or collectively configured to transmit a prior BFR message on the direct link before transmitting the BFR message on the indirect link.

3. The UE of claim 2, wherein the one or more processors are further individually or collectively configured to wait a time period for a BFR response on the direct link, and wherein the BFR message is on the indirect link as a result of no BFR response to the prior BFR message being within the time period.

4. The UE of claim 1, wherein the BFR message includes a first BFR message on the direct link and indicating a first beam and a second BFR message on the indirect link and indicating a second beam, wherein one of the first beam or the second beam is the selected beam.

5. The UE of claim 4, wherein the first BFR message and the second BFR message are in parallel.

6. The UE of claim 4, wherein at least one of the first BFR message or the second BFR message includes a time stamp.

7. The UE of claim 6, wherein the one or more processors are further individually or collectively configured to select, from one of the first beam or the second beam, the selected beam based at least in part on the time stamp.

8. The UE of claim 4, wherein the one or more processors are further individually or collectively configured to monitor, prior to receiving the updated beam configuration, the first beam and the second beam for communications from the network node.

9. The UE of claim 8, wherein the one or more processors, to monitor the first beam and the second beam, are configured to monitor the first beam and the second beam until the updated beam configuration from the network node is received on the selected beam.

10. The UE of claim 4, wherein the first BFR message and the second BFR message both indicate the selected beam.

11. The UE of claim 1, wherein the one or more processors are further individually or collectively configured to report, in each BFR message until a BFR procedure is complete, the selected beam.

12. The UE of claim 1, wherein the BFR message is on the indirect link via a sidelink communication.

13. The UE of claim 1, wherein the direct link is the failed link.

14. The UE of claim 1, wherein the BFR message is transmitted on the direct link via a random access channel (RACH) transmission.

15. The UE of claim 1, wherein the indirect link is the failed link.

16. A network node for wireless communication, comprising:

a memory; and one or more processors, coupled to the memory, individually or collectively configured to:

receive a beam failure recovery (BFR) message regarding a failed link, wherein the failed link is one of an indirect link with a remote user equipment (UE) via a relay node or a direct link with the remote UE, wherein the BFR message is received on one of the indirect link or the direct link that is not the failed link, wherein the BFR message is received on the direct link before receiving the BFR message on the indirect link; and transmit an updated beam configuration for the failed link on a selected beam indicated by the BFR message.

17. The network node of claim 16, wherein the BFR message includes a first BFR message on the direct link and indicating a first beam and a second BFR message on the indirect link and indicating a second beam, wherein one of the first beam or the second beam is the selected beam.

18. The network node of claim 17, wherein at least one of the first BFR message or the second BFR message includes a time stamp.

19. The network node of claim 18, wherein the one or more processors are further individually or collectively configured to select, from one of the first beam or the second beam, the selected beam based at least in part on the time stamp.

20. The network node of claim 17, wherein the first BFR message and the second BFR message both indicate the selected beam.

21. The network node of claim 17, wherein the updated beam configuration is on the first beam and the second beam.

22. The network node of claim 16, wherein the one or more processors are further individually or collectively configured to respond to each BFR message from the remote UE until a BFR procedure is complete.

23. The network node of claim 16, wherein the BFR message is on the indirect link via a sidelink communication.

24. The network node of claim 16, wherein the direct link is the failed link.

25. The network node of claim 16, wherein the BFR message is received on the direct link via a random access channel (RACH) transmission.

26. The network node of claim 16, wherein the indirect link is the failed link.

27. A method of wireless communication performed by a user equipment (UE), comprising:

transmitting a beam failure recovery (BFR) message regarding a failed link, wherein the failed link is one of an indirect link with a network node via a relay node or a direct link with the network node, wherein the BFR message is transmitted on one of the indirect link or the direct link that is not the failed link;

waiting a time period for a BFR response on the indirect link after transmitting the BFR message;

transmitting a second BFR message on the direct link if no BFR response is received on the indirect link within the time period; and receiving an updated beam configuration for the failed link on a selected beam indicated by the BFR message.

28. The method of claim 27, further comprising:

reporting, in each BFR message until a BFR procedure is complete, the selected beam.

29. The method of claim 27, wherein the BFR message is transmitted on the direct link via a random access channel (RACH) transmission.

* * * * *